Jan. 2, 1934.                W. A. FREEMAN                1,941,889
                            PIPE CLAMPING DEVICE
                            Filed Jan. 13, 1932
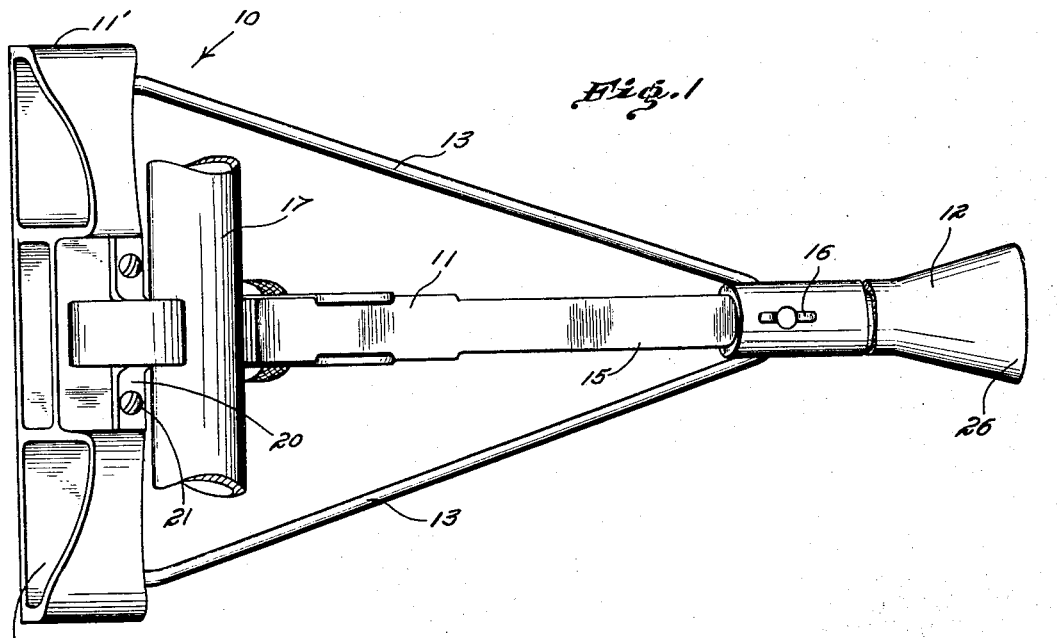
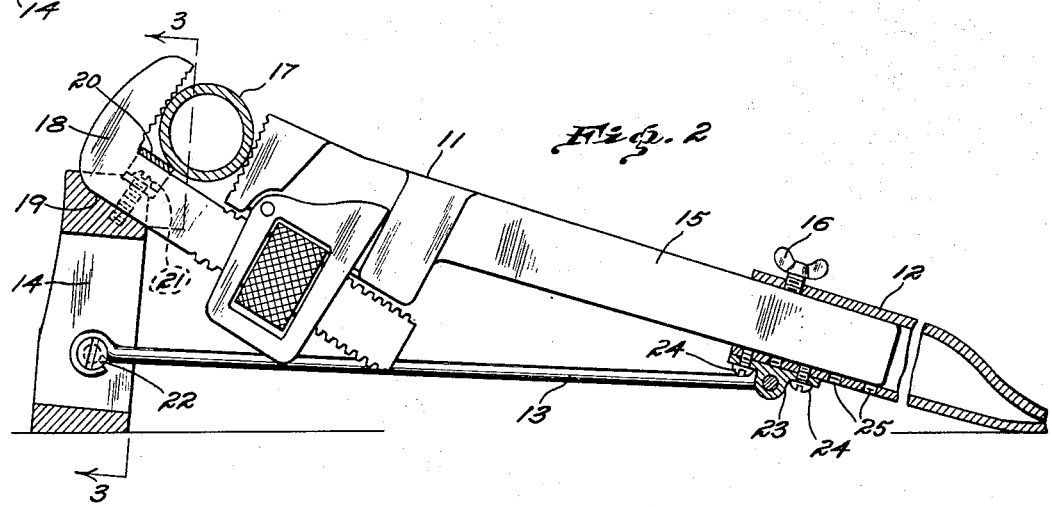
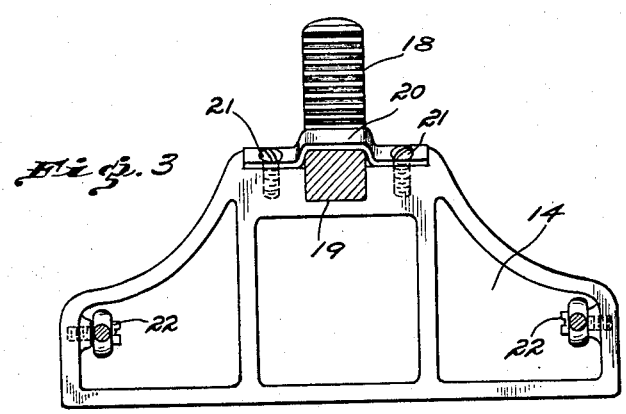
Inventor
William A. Freeman
by John Flam
Attorney Patented Jan. 2, 1934

1,941,889

UNITED STATES PATENT OFFICE 1,941,889

PIPE CLAMPING DEVICE

William A. Freeman, Los Angeles, Calif.

Application January 13, 1932. Serial No. 586,334

6 Claims. (Cl. 81—41)

This invention relates to a pipe clamping device, and more particularly to a means for rigidly gripping one length of pipe whereby a fitting or else another length may be readily coupled thereto to form a pipe line, or for removing a fitting or length from such a line.

It is often necessary to install or take apart long pipe lines for conducting water, oil or other utilities in connection with cattle ranches, oil fields and the like; or in connection with garden or lawn sprinkling systems. In actual practice the lengths or sections of pipe are placed on the ground in a direction coincident with the line of travel of the proposed pipe line. These lengths of pipe are then joined or coupled together to form the pipe line. Conversely, it is sometimes necessary to uncouple adjacent fittings or sections. Difficulty is often experienced in joining or separating the lengths or sections of pipe as they are supported and rotated by manual means and manually operated pipe wrenches. Ordinarily two pipe wrenches are required, one to hold a section of the pipe and the other to turn or thread a coupling to join or separate another section. Usually a block or rest is placed under the pipe to lift it up from the ground so as to permit the pipe wrenches to be used. Obviously this procedure is open to many disadvantages which render its use objectionable.

First, due to the relatively great weight of the pipe sections, at least two men are required to join or separate the pipe sections in a pipe line; one to hold one pipe section, and the other to rotate another section. And then, it is impossible for one man to hold a pipe section with sufficient rigidity while another section is being rotated, and consequently either the grip on the section being held is destroyed, or the pipe is badly scored.

I have found that the objections inherent in the present practice can be readily overcome by the provision of a novel means which can readily and rigidly hold a section of pipe so that another section can be quickly and conveniently rotated relative thereto. I accomplish this by means of a novel cradle or support to which an adjustable pipe wrench can be removably secured. Any suitable pipe wrench of the Stillson type can be used. The wrench is so arranged in the cradle that the pipe when inserted in the jaws, will be rigidly clamped thereby solely due to the action of the weight of the pipe on the jaws.

It is therefore an object of my invention to provide a novel device of the type described, which can rigidly hold a pipe section in spaced relationship from the ground so that another pipe section can be readily rotated with respect thereto.

It is a further object of my invention to provide a novel device of the type described which will rigidly grip a section of pipe solely due to the action of the weight of the pipe on the gripping jaws embodied in my device.

It is a further object of my invention to provide a novel cradle or support, for a pipe wrench which can be readily adjusted to accommodate any size wrench.

It is a further object of my invention to provide a novel device of the type described which is simple in design and construction, and relatively inexpensive to manufacture.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

Figure 1 is a plan view of the novel gripping device embodying my invention, and showing the manner in which a section of pipe is gripped thereby;

Fig. 2 is a longitudinal sectional view thereof showing the wrench in elevation; and Fig. 3 is a view taken substantially along the plane 3—3 of Fig. 2, with the section of pipe to be held, omitted.

My invention resides in an article of manufacture comprising a cradle 10 which forms a rest or support for a gripping device. The gripping device can be any one of the well-known adjustable jawed pipe wrenches of the Stillson type such as the wrench 11.

The cradle 10 comprises an upright or rest 11' and a spaced rearwardly extending holder and rest 12 joined to the upright rest 11' as by connecting links or stays 13 in a manner to be described. Cradle 10 can be formed of any desirable material such as metal, wood, and the like; although I preferably utilize an aluminum alloy casting for the sake of lightness. The upright rest 11' can be provided with openings or recesses 14 in order further to decrease the weight of the cradle. However, the upright rest 11' has sufficient structural strength and rigidity to support any weight of pipe section.

In actual practice, the wrench is placed in the cradle. The handle 15 of the wrench 11 is held in the holder 12 which is provided with a socket or suitable receptive portion to receive it and is firmly held in place therein as by a winged set screw 16. The movable jaw 18 of the wrench rests in a downwardly inclined recess 19 formed in the top of the upright rest 11'. The jaw 18 is held in the recess 19 as by a strap 20, of metal or other suitable material, which bridges the jaw. The strap 20 in turn is secured to the upright rest 11' as by screws 21. From the foregoing it will be apparent that the wrench 11 is supported in cradle 10 in an inclined position. The holder 12 may be of considerable length, whereby the effective length of handle 15 is increased and the downward pressure exerted by it due to the wrench resisting rotation of pipe 17 is decreased.

It is now apparent that when the pipe 17 is lifted off the ground and cradle 10 is placed under it, the pipe 17 can be dropped into the jaws of the wrench 11 meanwhile the hand of the operator holds the jaw 18 from below, so as to extend the jaws; then, as the pipe 17 is dropped between the jaws, the hand can be removed. The weight of the pipe 17 will then cause the lower portion of the movable jaw 18 to be depressed and consequently cause the upper portion thereof to converge with respect to the stationary jaw and thus intimately and rigidly grip the pipe. It will be noted that the holder 12 is placed on the ground with respect to the upright rest 11' in a direction towards which the wrench (not shown) for coupling another pipe section to pipe section 17, will be pulled. In this manner pipe 17 will always be urged downwardly on the movable jaw 18 and thus assure that the grip of the jaws on the pipe will not be broken.

Furthermore, if a section or coupling is to be removed, instead of installed, the device can be reversed so that a clamping effect is provided upon the pipe against such reverse rotation.

The stays 13 connecting the upright rest 11' and the holder 12 serve to lend stability to the cradle 10 and also to prevent the swerving of the holder when a pipe section is being coupled or removed. As is clearly shown in the drawing, each of the stays 13 is pivotally secured at one end adjacent the inner side walls of the upright rest 11' as by the studs 22. These stays converge toward the holder which is spaced centrally of rest 11', and the free ends thereof are pivotally secured in a connecting member 23 which in turn can be secured to the holder 12 as by screws 24. In this manner pivotal movement of holder 12 can be effected when the wrench is adjusted to accommodate varying sized pipes that is, as the wrench is adjusted, the holder swings pivotally about studs 22, which will vary the distance between it and pipe 17. The holder 12 is provided with additional openings 25 into which the screws 24 can be threaded for further varying the distance between the upright rest 11' and the holder. Thus, cradle 10 can be readily adjusted to accommodate pipe wrenches of varying sizes.

The stability of the cradle 10, while in use, can be further enhanced by inclining the upright rest 11' towards the holder 12 and by forming the outer end of the holder 12 in the form of a fan or fishtail as at 26. It is now apparent that I have produced a novel device for supporting a pipe wrench in an inclined position, which can be readily transported and used in the desired place for rigidly holding a pipe section above the ground so that another pipe section or a fitting can be readily rotated with respect thereto.

The member 14 has a long base, that in conjunction with the flared end 26 of handle 12, provides a stable structure not easily overturned when in use. Clockwise rotation of the member joined to pipe 17 by another wrench will produce a torque tending to urge the end 26 into the ground. The jaw wrench 15 can easily be adjusted to accommodate any size of pipe within the limits of the wrench.

I claim:

1. In a device of the character described, means forming a cradle for supporting a pipe wrench comprising, an upright rest, a holder spaced therefrom in a position substantially centrally of the extremities of the rest, and means connecting the holder to the rest, said means converging from the rest to the holder and being pivotally secured to the holder whereby said holder can be inclined towards the rest accommodating the handle of the wrench in the desired position.

2. The combination as set forth in claim 1, in which the means connecting the holder to the rest are pivotally secured to the sides of the rest.

3. In a device of the character described, means forming a cradle for supporting a pipe wrench comprising, an upright rest, means forming a downwardly inclined recess in the top central portion of the rest, a holder spaced therefrom and having a receptive portion opposed to said recess, and means connecting the holder to the rest, said means being pivotally connected to the sides of the rest and to the holder, and converging from the rest to the holder.

4. The combination set out in claim 3, in which the holder can be adjustably spaced from the rest and inclined towards the rest whereby varying sized pipe wrenches can be accommodated in the cradle in the desired position.

5. In a device of the character described, means forming a cradle for supporting a pipe wrench comprising, an upright rest, means forming a downwardly inclined recess in the top central portion of the rest, a holder spaced therefrom and having a receptive portion opposed to said recess, said rest being inclined towards said holder, and means connecting the holder to the rest, said means being pivotally connected to the sides of the rest and to the holder, and converging from the rest to the holder.

6. In a device of the character described, means forming a rest for supporting the head of an adjustable pipe wrench, a holder for the handle of the wrench, and a connection between the holder and the rest for permitting the holder to move pivotally with respect to the rest as the wrench is adjusted for various size pipes.

WILLIAM A. FREEMAN.